(12) United States Patent
Horlacher et al.

(10) Patent No.: US 8,235,078 B2
(45) Date of Patent: Aug. 7, 2012

(54) FILLER TUBE FOR A TANK

(75) Inventors: Frank Horlacher, Waiblingen (DE); René Koerber, Leutenbach (DE); Gerhard Mueller-Riederer, Bretzfeld (DE)

(73) Assignee: Theodor-Heuss-Strasse 12, Waiblingen (DE)

( * ) Notice: Subject to any disclaimer, the term of this patent is extended or adjusted under 35 U.S.C. 154(b) by 732 days.

(21) Appl. No.: 11/988,728

(22) PCT Filed: Jul. 4, 2006

(86) PCT No.: PCT/EP2006/006480
§ 371 (c)(1),
(2), (4) Date: Apr. 20, 2009

(87) PCT Pub. No.: WO2007/006451
PCT Pub. Date: Jan. 18, 2007

(65) Prior Publication Data
US 2009/0321441 A1    Dec. 31, 2009

(30) Foreign Application Priority Data
Jul. 13, 2005 (DE) .................... 20 2005 011 575 U

(51) Int. Cl.
*B65B 1/04* (2006.01)
*B65B 3/00* (2006.01)

(52) U.S. Cl. .................... 141/350; 220/86.2
(58) Field of Classification Search .......... 141/346–350; 220/86.2
See application file for complete search history.

(56) References Cited

U.S. PATENT DOCUMENTS

| | | | | |
|---|---|---|---|---|
| 3,148,713 | A * | 9/1964 | Jones, Jr. ........................ | 141/346 |
| 4,195,673 | A * | 4/1980 | Johnston et al. .............. | 141/349 |
| 4,248,279 | A * | 2/1981 | Warmbold .................... | 141/348 |
| 4,701,198 | A   | 10/1987 | Uranishi | |
| 4,881,655 | A * | 11/1989 | Jansky et al. ............. | 220/203.18 |
| 5,238,034 | A * | 8/1993 | Corfitsen ........................ | 141/94 |
| 5,474,115 | A * | 12/1995 | Fink, Jr. ........................ | 141/206 |
| 6,230,918 | B1* | 5/2001 | Huynh et al. ................. | 220/300 |

FOREIGN PATENT DOCUMENTS
DE      203 15 807 U1     1/2004
* cited by examiner

*Primary Examiner* — Timothy L Maust
(74) *Attorney, Agent, or Firm* — Bacon & Thomas, PLLC

(57) ABSTRACT

A filler tube for a tank made of plastic for preventing an incorrect filling of the tank is provided with a permanent magnet, which is accommodated in a liquid-tight manner, and with a plastic holder for holding the permanent magnet. The filler tube of the aforementioned type for a tank made of plastic, which can be manufactured more easily, has fewer components and which can be mounted more easily. To this end, the filler tube is made of plastic and the plastic holder, which holds the permanent magnet, is directly connected in a liquid-tight manner to the filler tube.

7 Claims, 2 Drawing Sheets

FILLER TUBE FOR A TANK

TECHNICAL FIELD

The present invention relates to a filler tube for a tank made of plastic for preventing an incorrect filling of the tank.

BACKGROUND DISCUSSION

In systems for preventing an incorrect filling, for example for fuel tanks, it is known to provide the filler tube with a permanent magnet and the pump nozzle with a sensor, which releases a supply valve upon coming into contact with the magnetic field of the permanent magnet. In systems of this type, it is known to manufacture the tank from plastic and the filler tube for the tank from aluminum. For this combination of materials in filler tube and tank, the permanent magnet is placed on a plastic jacket between two sealing rings, a plastic cap being placed onto the jacket in such a way that the interior space accommodating the permanent magnet is sealed tight against liquids. This multipart plastic holder is mounted in the aluminum filler tube and is welded to the plastic tank. This design of the filler tube for a system for preventing incorrect filling results in a relatively expensive manufacturing and assembly process because the permanent magnet must be inserted into a separate holder component, which is made up of multiple individual parts.

SUMMARY OF THE INVENTION

It is the objective of the present invention to indicate a filler tube of the type cited above for a plastic tank for preventing an incorrect filling of the tank, which can be manufactured and assembled in a simpler manner, requiring fewer components.

To achieve this objective in a filler tube for a plastic tank for preventing an incorrect filling of the tank of the aforementioned type.

Measures in accordance with the invention make it possible to provide only one single component having the permanent magnet within the filler tube that is well suited for a [system for preventing] an incorrect filling, said component as an insert together with the filler tube making a liquid-tight accommodation of the permanent magnet possible.

The joining of a plastic holder and filler tube can be accomplished in a preferred manner by adhesion, welding, or clamping (latching).

A simple insertion of the plastic holder in the filler tube results from providing ribs that run axially on the exterior circumferential side of the plastic holder.

On the basis of ventilation boreholes within a support ring, ventilating the tank to be filled is accomplished in a simple manner.

One advantageously designed embodiment of the filler tube can be derived by the filler tube at an axial distance from its cover plate receptacle which is an integral part of a concentric interior basket. The cover plate stands on its head and the base is radially joined on the exterior side to the interior wall of the filler tube, and, bordering on the interior wall, to said axial ventilation boreholes. The interior basket is also provided centrally with a central axial opening, and an annular free space, which is aligned with said ventilation openings, between the concentrically arranged cylindrical interior basket and the interior wall of the filler tube.

The present invention also relates to a tank made of plastic having a welded-on filler tube.

BRIEF DESCRIPTION OF THE DRAWINGS

Further details of the present invention can be derived from the following description, in which the invention is described and explained in greater detail on the basis of the exemplary embodiment that is depicted in the drawing.

DETAILED DISCUSSION

Figure 1:
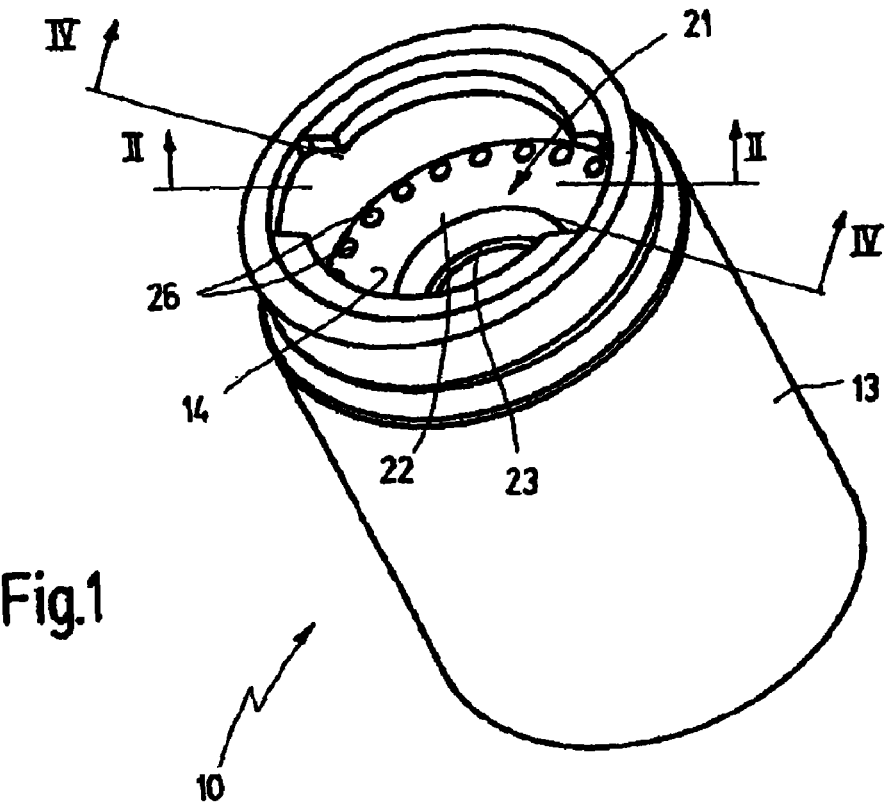
FIG. 1 is a perspective representation from the point of view of the filler side, depicts a filler tube according to one preferred exemplary embodiment of the present invention.
Figure 2:
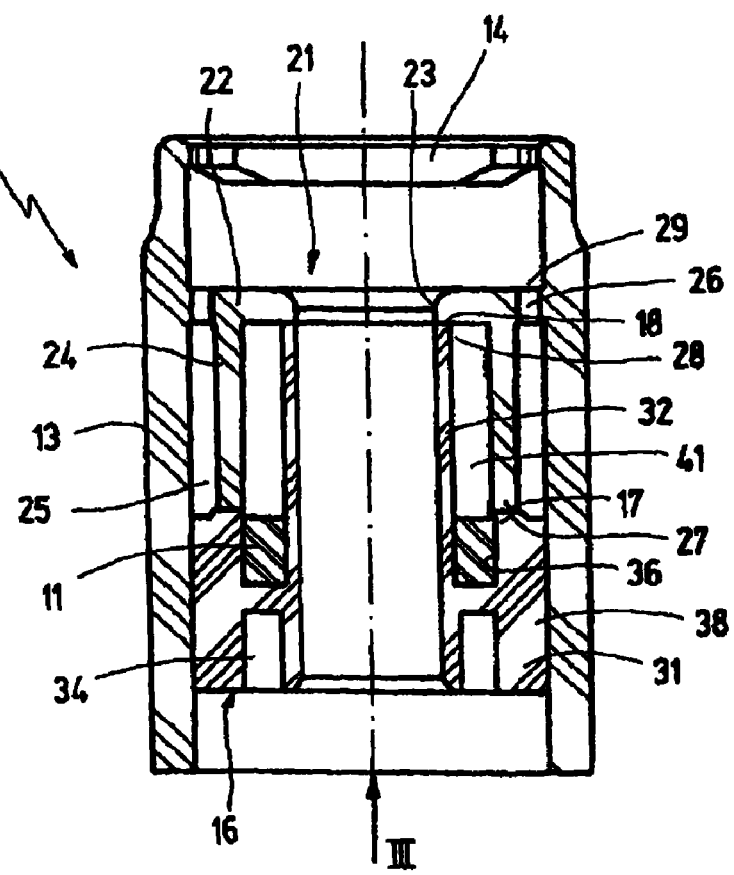
FIG. 2 depicts a cutaway view along the line II-II of FIG. 1.
Figure 3:
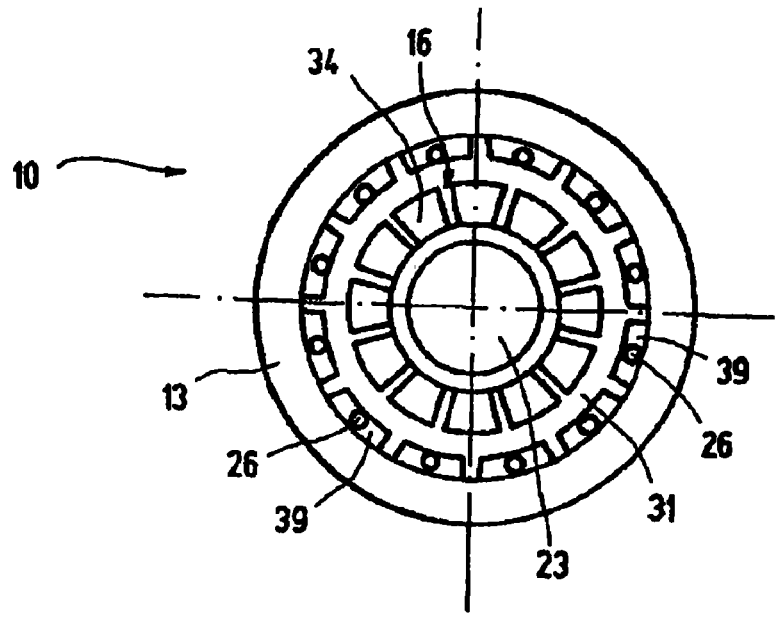
FIG. 3 depicts a bottom view according to arrow III of FIG. 2.
Figure 4:
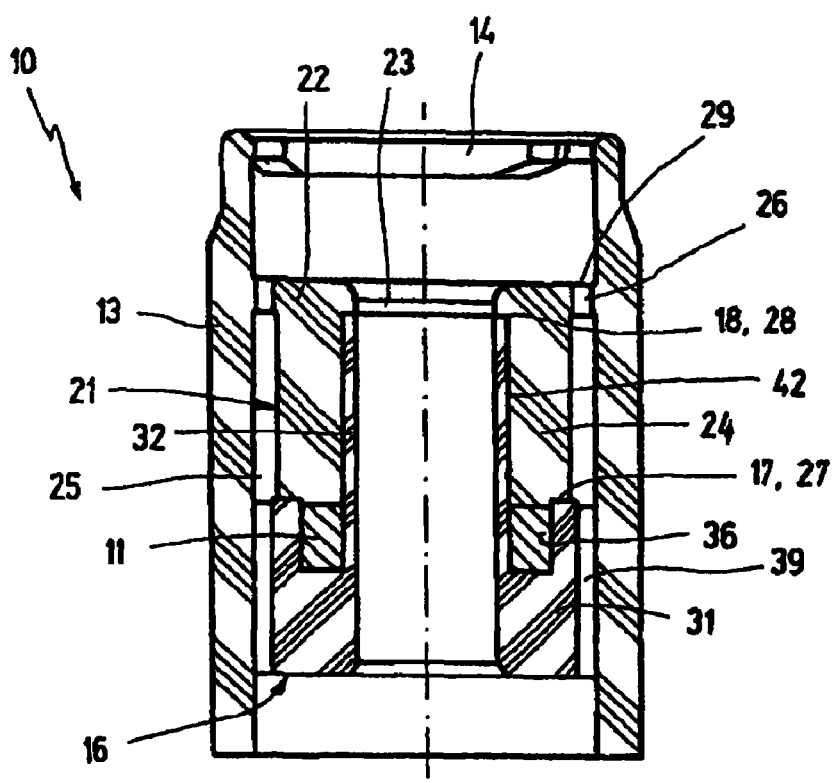
FIG. 4 depicts a cutaway view along the line IV-IV of FIG. 1.

Filler tube 10, depicted in the drawing according to one preferred exemplary embodiment, is provided with a permanent magnet 11, here in the form of a ring magnet, which acts as a switching magnet for a system for preventing an incorrect filling for a tank which is connected to a filler tube 10 of this type. In a system for preventing an incorrect filling of this type, the pump nozzle for the liquid is provided with a sensor, which, when the pump nozzle is inserted, is activated by the permanent magnetic field, resulting in the opening of a supply valve. For example, systems of this type are used for diesel fuel or for filling tanks with urea solution for catalytic converters to reduce NOx in trucks.

Filler tube 10 has a tube jacket 13, which at its free access end is provided with an opening 14, which is designed such that a bayonet cover plate can be detachably fixed to tube jacket 13. In an assembled state to be discussed below, the other end of tube jacket 13, which is made of plastic, is welded in a manner not depicted to the plastic tank, which is also not depicted here.

A holder 16, also made of plastic, for permanent magnet 11 is inserted into tube jacket 13 and attached. In this context, permanent magnet 11 is accommodated between holder 16 and tube jacket 13 in a liquid-tight manner.

For this purpose, tube jacket 13 of filler tube 10 at an axial distance from its bayonet cover opening 14 has an interior basket 21, which is molded as an integral part of tube jacket 13. Interior basket 21, which is one part, has a base 22, which on the exterior circumferential side is molded as an integral part of the interior circumference of tube jacket 13. Base 22 has a central opening 23, which is arranged beneath bayonet cover opening 14 and is essentially flush with the latter. Interior basket 21 has a tubular segment 24 which hangs from base 22 and which is arranged concentrically with respect to tube jacket 13, an annular space 25 remaining between the exterior circumference of the tubular segment and the interior circumference of tube jacket 13. Provided at its exterior support ring 29 of base 22 and radially projecting beyond tubular segment 24 are axial boreholes 26 that are arranged so as to be uniformly distributed around the circumference and that discharge into annular space 25. Tubular segment 24 on the interior circumferential side is provided with grooves 41 and ribs 42, which extend axially.

In this embodiment, filler tube 10, composed of tube jacket 13 and interior basket 21, is molded as one single plastic piece, for example, through injection molding.

Holder 16, which is made of plastic and is also a single piece, has a thick-wall, cylindrical base part 31, which, facing interior basket 21, is provided with a receiving annular space 36, in which permanent magnet 11, which here has an annular shape, is accommodated so as to be radially immovable. The interior wall that borders receiving annular space 36 is extended in the axial direction to an interior cylinder 32, which at its free end forms an upper annular surface 18. Base part 31 at its radial exterior side is provided with an upper annular surface 17. The axial dimensions of permanent magnet 11 are somewhat smaller than the axial dimensions of receiving annular space 36. Interior cylinder 32 at base part 31 borders a central receiving space for an undepicted pump nozzle and acts as an intake space for the relevant liquid into the undepicted tank. The axial difference in dimensions between base part 31 and interior cylinder 32 corresponds to the axial difference between base 22 and tubular segment 24 of interior basket 21. The free lower side of base part 31 is provided with axial blind-hole recesses 34 that are distributed around the circumference.

The exterior circumference of base part 31 is provided with axial ribs 38 and grooves 39 that are arranged so as to be uniformly distributed around the circumference. Grooves 39 in this context are arranged so that they are axially flush with every second axial borehole 26 within base 22 of filler tube 10, whereas axial boreholes 26 that are situated in between are covered by ribs 38. By means of ribs 38, holder 16 is centered in tube jacket 13 and then glued to it.

After the insertion of annular permanent magnet 11 into receiving annular space 36, holder 16, which is made of plastic and is designed in this way, is pushed to the lower side of tube jacket 13 with protruding interior cylinder 32 in front until upper annular surface 17 of base part 31 of holder 16 contacts lower annular surface 27 of tubular segment 24, and upper annular surface 18 of interior cylinder 32 contacts lower surface 28 of the base area that surrounds and borders opening 23. In this context, annular surface 17 is adhesively joined to annular surface 27, and annular surface 18 is adhesively joined to annular surface 28, so that receiving annular space 36 having permanent magnet 11 is shielded from the interior of filler tube 10 and from its tube jacket 13 and holder 16 in a liquid-tight manner.

Holder 16 terminates at its lower side before the lower side of tube jacket 13, which, in the assembled state described above, is welded in an undepicted manner to the undepicted plastic tank.

The invention claimed is:

1. A filler tube for a tank made of plastic for preventing an incorrect filling of the tank, having:
    a permanent magnet that is accommodated in a liquid-tight manner; and
    a plastic holder for said permanent magnet, wherein:
    the filler tube is made of plastic, and said plastic holder accommodating said permanent magnet is directly joined to the filler tube in a liquid-tight manner;
    said plastic holder has an annular space, having a closed off base side, for said permanent magnet; and
    said annular space can be connected to at least one annular cover that is provided radially within the filler tube.

2. A filler tube for a tank made of plastic for preventing an incorrect filling of the tank, having:
    a permanent magnet that is accommodated in a liquid-tight manner; and
    a plastic holder for said permanent magnet, wherein:
    the filler tube is made of plastic, and said plastic holder accommodating said permanent magnet is directly joined to the filler tube in a liquid-tight manner;
    said plastic holder has an annular space, having a closed off base side, for said permanent magnet;
    said annular space can be connected to at least one annular cover that is provided radially within the filler tube; and
    said annular space for said permanent magnet is provided with cylindrical border walls that are axially of unequal lengths and that at their end face in each case contact an annular surface of the filler tube.

3. The filler tube as recited in claim 2, wherein:
    said plastic holder and the filler tube are glued, welded, or clamped (latched) to each other.

4. The filler tube as recited in claim 2, wherein:
    said plastic holder is centered within the filler tube by means of ribs that run axially on the exterior circumferential side of said plastic holder.

5. The filler tube as recited in claim 4, wherein:
    the filler tube further has: a radial interior support ring;
    several axial ventilation boreholes are advantageously arranged so as to be distributed over said radial interior support ring of the filler tube.

6. The filler tube as recited in claim 5, wherein:
    said axial ventilation boreholes, within the support ring of the filler tube, are flush with grooves that are arranged on the circumferential side between said ribs of said plastic holder.

7. The filler tube as recited in claim 5, wherein:
    the filler tube further has: a cover plate receptacle, and the filler tube at an axial distance from its cover plate receptacle is an integral part of a concentric interior basket, which stands on its head and whose base is radially joined on the exterior side to the interior wall of the filler tube, and, bordering on the interior wall, to said axial ventilation boreholes, and
    said interior basket is also provided centrally with a central axial opening, and an annular free space, which is aligned with said ventilation openings, between the concentrically arranged cylindrical interior basket and the interior wall of the filler tube.

* * * * *